US009830564B2

(12) United States Patent
Small et al.

(10) Patent No.: US 9,830,564 B2
(45) Date of Patent: Nov. 28, 2017

(54) CUSTOMIZED AUTOMATED CHECKLIST CREATION, EXECUTION AND COMMUNICATION

(75) Inventors: Gregory J. Small, Federal Way, WA (US); Christopher R. Small, Everett, WA (US)

(73) Assignee: The Boeing Company, Chicago, IL (US)

( * ) Notice: Subject to any disclaimer, the term of this patent is extended or adjusted under 35 U.S.C. 154(b) by 1093 days.

(21) Appl. No.: 13/307,250

(22) Filed: Nov. 30, 2011

(65) Prior Publication Data

US 2013/0138467 A1 May 30, 2013

(51) Int. Cl.
*G06Q 10/06* (2012.01)
(52) U.S. Cl.
CPC .................................. *G06Q 10/06* (2013.01)
(58) Field of Classification Search
None
See application file for complete search history.

(56) References Cited

U.S. PATENT DOCUMENTS

| 3,713,090 | A | | 1/1973 | Dickinson |
| 4,635,030 | A | | 1/1987 | Rauch |
| 4,970,683 | A | | 11/1990 | Harshaw et al. |
| 5,019,980 | A | | 5/1991 | Starr et al. |
| 5,454,074 | A | | 9/1995 | Hartel et al. |
| 5,522,026 | A | * | 5/1996 | Records et al. ............. 715/710 |
| 6,181,990 | B1 | | 1/2001 | Grabowsky et al. |
| 6,262,720 | B1 | | 7/2001 | Jeffrey et al. |
| 6,753,891 | B1 | | 6/2004 | Chohan et al. |
| 7,421,319 | B2 | * | 9/2008 | Stefani .............................. 701/3 |
| 7,747,382 | B2 | | 6/2010 | Small et al. |
| 7,813,871 | B2 | | 10/2010 | Small et al. |
| 8,260,736 | B1 | * | 9/2012 | Lear et al. ...................... 706/46 |

(Continued)

FOREIGN PATENT DOCUMENTS

| CN | 101916278 A | 12/2010 |
| EP | 2266880 A1 | 12/2010 |

(Continued)

OTHER PUBLICATIONS

Small, Greg, Architecture Redevelopment Scope, Jun. 1, 2009.

(Continued)

*Primary Examiner* — Thomas L Mansfield, Jr.
(74) *Attorney, Agent, or Firm* — Charles L. Moore; Moore & Van Allen PLLC

(57) ABSTRACT

A method for creating, executing and communicating customized, automated checklists may include dynamically creating a customized checklist including a plurality of checklist items. The method may also include transmitting a notification to a predetermined recipient that the customized checklist is available. The method may additionally include displaying the customized checklist on an interface device in response to the customized checklist being selected by the recipient. The method may additionally include updating a status of each checklist item in response to each checklist item being completed. The method may further include determining if a new checklist is available during execution of an existing checklist and allowing a user to switch to the new checklist during the execution of the existing checklist.

26 Claims, 5 Drawing Sheets

(56) References Cited

U.S. PATENT DOCUMENTS

| | | | |
|---|---|---|---|
| 2002/0010532 A1* | 1/2002 | Sinex | 701/29 |
| 2002/0165647 A1* | 11/2002 | Glenn et al. | 701/3 |
| 2008/0010005 A1 | 1/2008 | Small et al. | |
| 2008/0010107 A1 | 1/2008 | Small et al. | |
| 2008/0162155 A1 | 7/2008 | Small et al. | |
| 2010/0312420 A1* | 12/2010 | Sham et al. | 701/3 |

FOREIGN PATENT DOCUMENTS

| | | |
|---|---|---|
| JP | 2005512169 A | 4/2005 |
| JP | 2008125734 A | 6/2008 |
| JP | 2011502073 A | 1/2011 |
| WO | WO 95/26012 A1 | 9/1995 |

OTHER PUBLICATIONS

Schamel, John, How the Pilot's Checklist Came About, Avaition Checklist, www.atchistory.org/History/checklst.htm, Jan. 31, 2011.
Arkell, Debby, From Safer to Safer, Boeing's Electronic Checklist marks 10 years of enhanced safety for pilots and travelers, Boeing Frontiers Online, vol. 04, issue 11, Apr. 2006.
UK Patent Office, Search Report dated Apr. 30, 2013.
Japanese Patent Office; Office Action for Japanese Patent Application No. 2012-261532 dated Oct. 18, 2016, 8 Pages.
UK Intellectual Property Office; Office Action for U.K. Patent Application No. GB1221680.0 dated Apr. 9, 2015, 4 Pages.
U.K. Intellectual Property Office; Office Action for U.K. Patent Application No. GB1221680.0 dated Mar. 14, 2016, 2 Pages.
UK Intellectual Property Office; Office Action for U.K. Patent Application No. GB1221680.0 dated Dec. 8, 2015, 3 Pages.
Japanese Patent Office; Office Action for Japanese Patent Application No. 2012-261532 dated Sep. 12, 2017, 6 Pages.

* cited by examiner

CUSTOMIZED AUTOMATED CHECKLIST CREATION, EXECUTION AND COMMUNICATION

BACKGROUND

Aspects of the present disclosure relate to checklists associated with a vehicle or system, such as an aircraft or other vehicle or system, and more particularly to a method, system and computer program product for customized checklist creation, execution and communication of checklist completion activity.

Checklists are often used to insure that a procedure is performed in the right sequence or most efficient sequence. However, conditions associated with the vehicle or system can change during completion of a checklist and the checklist may thus become outdated or obsolete. Checklist items may then be performed that may be unnecessary or may be detrimental because of changed conditions resulting in inefficiencies or possible adverse results. There currently is no mechanism to generate a new checklist that is optimized or customized for current vehicle conditions while a checklist is being executed. Current systems typically require a checklist to be completed before a new checklist can be generated and/or presented for completion which again can result in inefficiencies and other adverse results particularly in situations that may call for timely action or attention. Additionally, there is no sharing or communication of checklist status or information with other onboard systems let alone back-office systems or other systems for review and analysis.

BRIEF SUMMARY

According to one aspect of the present disclosure, a checklist system and/or method continually determines a condition of a vehicle, such as an airplane or system under normal and abnormal conditions, for example emergency conditions. The checklist system may determine conditions of the vehicle by examining onboard systems. The checklist system may dynamically create a customized checklist from one or more required checklists and actual conditions of the vehicle or system. The checklist system may notify an intended recipient, such as a pilot or other crewmember, that the customized checklist is available. The customized checklist may be displayed in response to the recipient of the notification requesting a specific checklist or selecting an option to display the automatically generated customized checklist. The checklist system determines when each checklist item is completed. The checklist system may determine when each checklist item is completed from onboard systems, or from manual pilot or crewmember inputs. The checklist results may be stored along with airplane parameters relevant to the customized checklist. The checklist system may communicate checklist information and vehicle parameters as supplemental information to other onboard vehicle systems. The other onboard systems may be nonessential onboard systems that are not critical to operation of the vehicle, such as for example, a health management system of the vehicle, electronic logbook, and other vehicle systems that may be able to utilize the checklist information. If one checklist is being executed by a user while another checklist is created, the pilot or other crewmember may be prompted or notified that a new checklist is available. The pilot or other crewmember can choose to continue with the existing checklist or switch to the new customized checklist.

The checklist system may also communicate checklist information and vehicle parameters to back-office systems or other systems via off-board communication links. The checklist information may be communicated in real-time or may be delayed until available communication capabilities and capacity are available. Back-office systems receiving the checklist information and vehicle parameters may include but are not necessarily limited to airline systems; Maintenance, Repair and Overhaul (MRO) systems; and Regulatory Authority systems. These back-office systems may combine checklist information with other data to create situational awareness of the vehicle or airplane, determine out of tolerance conditions, and may contact the pilot, creating a closed-loop system.

According to one aspect of the present disclosure, a method for creating, executing and communicating customized, automated checklists may include dynamically creating a customized checklist including a plurality of checklist items. The method may also include transmitting a notification to a predetermined recipient that the customized checklist is available. The method may additionally include displaying the customized checklist on an interface device in response to the customized checklist being selected by the recipient. The method may additionally include updating a status of each checklist item in response to each checklist item being completed. The method may further include determining if a new checklist is available during execution of an existing checklist and allowing a user to switch to the new checklist during the execution of the existing checklist.

According to another aspect of the present disclosure, a system for creating, executing and communicating customized, automated checklists may include an automated checklist system communicatively coupled to at least one system on a vehicle or system. The automated checklist system may be adapted to dynamically create a customized checklist including a plurality of checklist items, transmit a notification to a predetermined recipient that the customized checklist is available, and indicate checklist items as completed based on changes to parameters including manual input. The system may also include an interface device for displaying the customized checklist in response to the customized checklist being selected by the recipient. A status of each checklist item may be updated by the automated checklist system or by any manual input and may be displayed on the interface device in response to each checklist item being completed. The recipient may be notified during execution of an existing checklist when a new checklist is available for use. An option may be presented to the recipient to continue with the existing checklist or to switch to the new checklist.

According to a further aspect of the present disclosure, a computer program product for creating, executing and communicating customized, automated checklists may include a computer readable storage medium having computer readable program code embodied therewith. The computer readable program code may include computer readable program code configured to dynamically create a customized checklist including a plurality of checklist items. The computer readable program code may also include computer readable program code configured to transmit a notification to a predetermined recipient that the customized checklist is available and to display the customized checklist on an interface device in response to the customized checklist being selected by the recipient. The computer readable program code may also include computer readable program code configured to update a status of each checklist item in response to each checklist item being completed. The computer readable program code may additionally include computer readable program code configured to determine if a new checklist is available during execution of an existing checklist. The computer readable program code may further include computer readable program code configured to allow a user to switch to the new checklist during the execution of the existing checklist.

BRIEF DESCRIPTION OF THE SEVERAL VIEWS OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
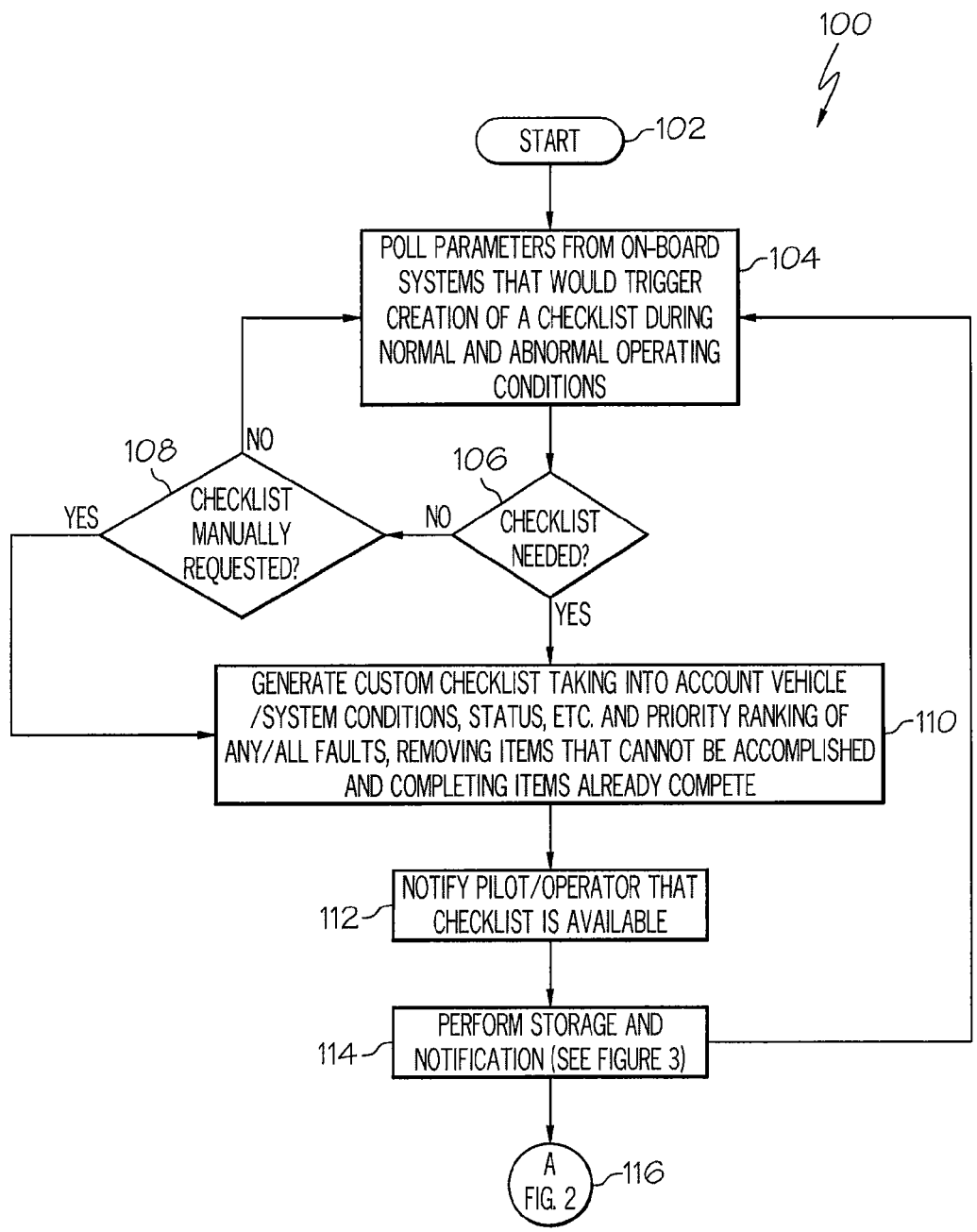
FIG. 1 is a flow chart of an example of a method for automatically creating a customized checklist taking into account parameters on the aircraft, illustrating an exemplary checklist system according to one embodiment of the present disclosure.

The present disclosure is directed to a method, system and computer program product for producing custom checklists whenever needed under normal and abnormal operating conditions, allowing the recipient of the checklist to switch to a new checklist at any time, and for checklist information to be communicated to other systems on and off the vehicle for further processing. An example standard checklist for an aircraft engine damage abnormal operating condition is shown below:

Engine Fire, Severe Damage or Separation

| | |
|---|---|
| THRUSE LEVER | CLOSE |
| Disengage autothrottle if on | |
| FUEL CONTROL SWITCH | CUTOFF |
| If engine fire warning light remains illuminated: | |
| ENGINE FIRE SWITCH | ROTATE |
| Rotate to the stop and hold for 1 second. | |
| After 30 seconds, if engine fire warning light remains illuminated: | |
| ENGINE FIRE SWITCH | ROTATE TO REMAINING BOTTLE |
| Rotate to the stop and hold for 1 second. | |
| APU (if available) | START |
| GROUND PROXIMITY FLAP OVERRIDE SWITCH | OVRD |
| If wing anti-ice required: | |
| ONE PACK CONTROL SELECTOR | OFF |

-continued

| | |
|---|---|
| ISOLATION SWITCH | ON |
| Return to OFF when wing anti-ice is no longer required. | |
| LANDING PREPARATION | |
| Use flaps 20 and VREF 20 for Landing and flaps 5 for go-around | |

As can be seen, the standard checklist contains items that could be removed from a customized checklist depending on the aircraft condition or would be automatically completed, thereby providing the correct and appropriate information to the pilot. For example, an automated checklist system would not include a "disengage autothrottle" item if it could be determined from other onboard systems that the autothrottle was not on. Likewise, if the auxiliary power unit (APU) is not available the checklist item to start the APU could be removed. Likewise, if it could be determined from other onboard systems that anti-ice is not required then those checklist items would be removed and not shown to the pilot. When for example, notification is received by the checklist system that the fuel control switch is set to cutoff, and the engine fire switch has been rotated, those tasks would be automatically indicated as completed by the checklist system. Additionally, if the fire warning light goes off within 30 seconds of the engine fire switch being rotated to the stop position, a new checklist can be created that does not include those items. The pilot can choose to switch to the new checklist or continue executing the existing checklist.

For a more complex abnormal condition where the engine damage results in an uncontained engine failure that in turn results in a puncture to the passenger cabin causing depressurization, the checklist priority depends on the altitude of the aircraft at the time of the incident. When the aircraft is above 10,000 feet the priority is first with immediate passenger safety, requiring beginning descent and deploying oxygen masks prior to exercising the engine damage checklist. Because the condition of the aircraft is constantly changing it is highly desirable that the pilot have the correct and up to date checklist at all times. For example, if the aircraft is at 10,500 feet when the combined engine damage and passenger cabin depressurization conditions occurs, the automated checklist system would present a checklist having descend and deploy oxygen masks items before the engine damage items. As the pilot starts to complete the checklist the aircraft drops below 10,000 feet, so the automated checklist system creates a new checklist, correct for the new conditions of the aircraft having only the engine damage items since deploying the oxygen masks is no longer required. The pilot would have the opportunity to switch to the new checklist as soon as it becomes available. Doing so in this situation could alleviate significant passenger anxiety by avoiding oxygen masks dropping from the overhead compartments, and would allow the pilot to start putting out the engine fire sooner.

Checklist information, comprised of the checklist items, their sequence, the user responding to the checklist by completing items, the completion activity, and all relevant aircraft conditions are monitored and stored by the checklist system. This stored checklist information is delivered to other onboard systems, for example a health management system, for further processing. For example, health management system information could be augmented with the addition of airplane condition information from the automated checklist system, including the normal operational conditions of the aircraft at the time a fault occurred. This supplemental information could provide context of the fault and provide the raw material for improved health management analytics. Additionally, the association of faults and the timing of pilot response actions provides both cause and effect information supplemental to flight deck effects.

Checklist information stored on the aircraft may also be delivered to airline back-office systems to provide situation awareness. By delivering all checklist information for all aircraft in the fleet during normal and abnormal operations to the airline a much more complete understanding of each specific aircraft is possible. Airlines can integrate aircraft checklist data with averages for that model to identify pilot and crewmember best practices that promote safety and efficiency. Airlines can get more precise information on pre-departure activity when cabin and cockpit checklist information is combined with flight schedule to more accurately predict delay duration. Airlines can know the degree to which pilot and crewmember checklists are being followed according to company procedures. The airline operations center, maintenance operations center and relevant station operations center can know when an irregular operational situation occurs without the need for pilot notification.

Checklist information stored on the aircraft may also be delivered to back-office systems of regulatory authorities to provide situation awareness. Regulatory authorities can have a more complete understanding of cockpit activity. If a pilot is directed to a new altitude or direction and does not comply, an automated alert can be generated, relieving air traffic control operators from the burden of physically monitoring their orders. With the self-reported position of all aircraft through landing checklist information, automated airport collision avoidance alerts can be created for any aircraft that are within a minimum separation distance or approaching minimum separation distance. Regulatory authority alerting of an aircraft that is below the minimum and not having landing gear deployed could produce an airport air traffic control alert causing a go-around order, averting an accident.

Checklist information stored on the aircraft may also be delivered to back-office systems of maintenance, repair and overhaul companies to provide situation awareness. Maintenance, repair and overhaul companies can be alerted of faults and more importantly, pilot response actions. By observing the cause and effect of pilot checklist item completion and aircraft condition changes a better understanding of underlying root cause maintenance issue may be realized, which can translate into alternative planned maintenance activities once the aircraft arrives.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, but not limited to, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in, but not limited to, any combination of one or more programming languages, including an object oriented programming language such as Java, Smalltalk, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational items to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of an example of a method 100 for creating customized, automated checklists in accordance with an embodiment of the present disclosure. The method 100 may start at block 102. In block 104, onboard parameter values that would trigger creation of a checklist may be monitored. An automated checklist system as described herein may poll one or more systems on a vehicle, such as an aircraft or other vehicle, for parameters from at least one of vehicle systems that may indicate a condition or fault to cause generation of a checklist.

In block 106, a determination may be made if a new checklist is needed. If a new checklist is not needed the method 100 determines if a request has been made for a specific checklist in response to a manual checklist request 108 from a pilot, crewmember or system operator. If no manual request has been made for a specific checklist 108, the method 100 returns to block 104. If a new checklist is required to be created, due to the condition of on-board parameters 106 or manual request 108, the method 100 may advance to block 110.

In block 110, a customized checklist may be generated taking into account any existing vehicle or system conditions or other information that may include but is not necessarily limited to status of any current checklist items and a priority ranking of any faults or conditions associated with any vehicle or aircraft systems or subsystems. The customized checklist may be dynamically generated or created from one or more standard checklists for the vehicle or system and incorporating the current conditions of the vehicle or system. The customized checklist may be optimized by removing any checklist items that cannot be completed. The customized checklist may be optimized by re-sequencing checklist items, and by completing checklist items based on the current condition of the vehicle. For example, checklist items may be removed for some vehicle systems which are non-operational, may be re-sequenced based on checklist priorities or a priority or importance of items remaining in the customized checklist, and may be completed based on information from vehicle systems.

In block 112, the pilot or crewmember may be notified that the new checklist is available.

In block 114, a storage and notification routine (described with reference to FIG. 3) may be performed to store the new checklist and any associated information and to notify or communicate the new checklist and associated information to other onboard systems and to back-office systems. As described herein, examples of off-board back-office systems may include but is not necessarily limited to airline systems, maintenance, repair and overhaul (MRO) systems, regulatory authority systems and other systems. An example of a storage and notification routine for onboard storage of checklist information and notification or communication of checklist information to other onboard systems and off-board systems or facilities will be described with reference to FIG. 3.

The method 100 is independent, of method 200. Method 100 continuously executes without consideration of the method 200. After creating the customized checklist in method 100, the checklist is executed, as described in FIG. 2.

Figure 2:
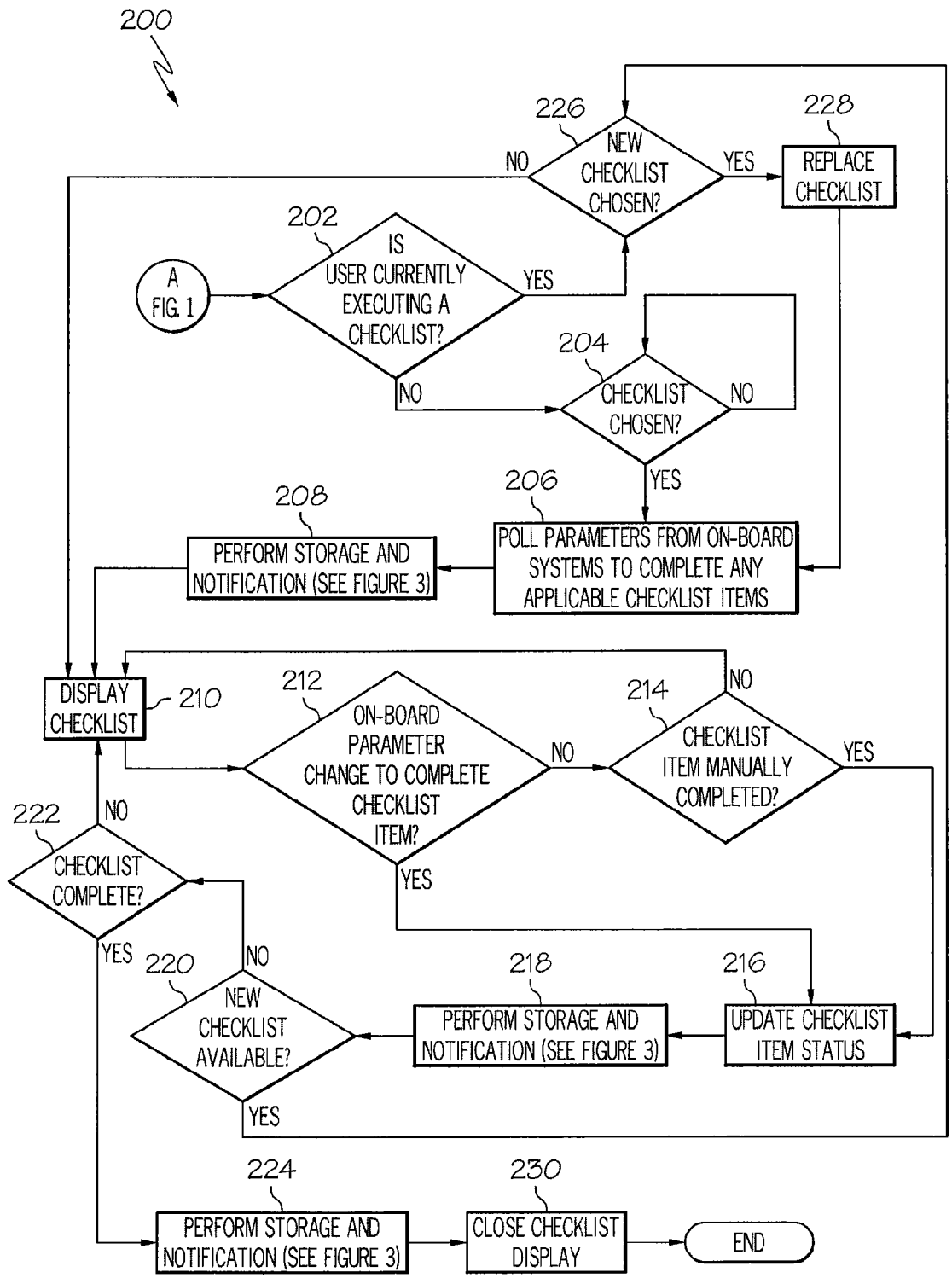
FIG. 2 is a flow chart of an example of a method for executing a customized, automated checklists and providing an option to switch to a new checklist at any time, in accordance with an embodiment of the present disclosure.

FIG. 2 is a flow chart of an example of a method 200 for executing customized, automated checklists in accordance with an embodiment of the present disclosure. In block 202, a determination may be made if the pilot, crewmember or operator is already executing a checklist. If not, the method 200 may advance to block 204. In block 204, a determination may be made if the pilot, crewmember or operator has chosen to execute the checklist. If not, the method 200 may continue to poll for the pilot, crewmember or operator to choose to execute the checklist. If the pilot, crewmember or operator chooses to execute the checklist, the method 200 may advance to block 206. In block 206, parameters from on-board systems may be polled to complete any applicable checklist items.

In block 208, the checklist information may be stored and a notification may be transmitted, as described with reference to FIG. 3.

In block 210, the customized checklist may be displayed. In block 212, a determination may be made if parameters from on-board systems have changed that result in the completion of one or more checklist items. If so, the method 200 may advance to block 216 and the checklist item status is updated.

If parameters from on-board systems have not changed in block 212, the method 200 may advance to block 214. In block 214, a determination is made if manual interaction with the checklist system results in the completion of one or more checklist items. Is so, the method 200 may advance to block 216 and the checklist item status is updated. If no new checklist items have been manually completed in block 214, the method 200 advances to block 210 and the checklist is displayed.

Figure 3:
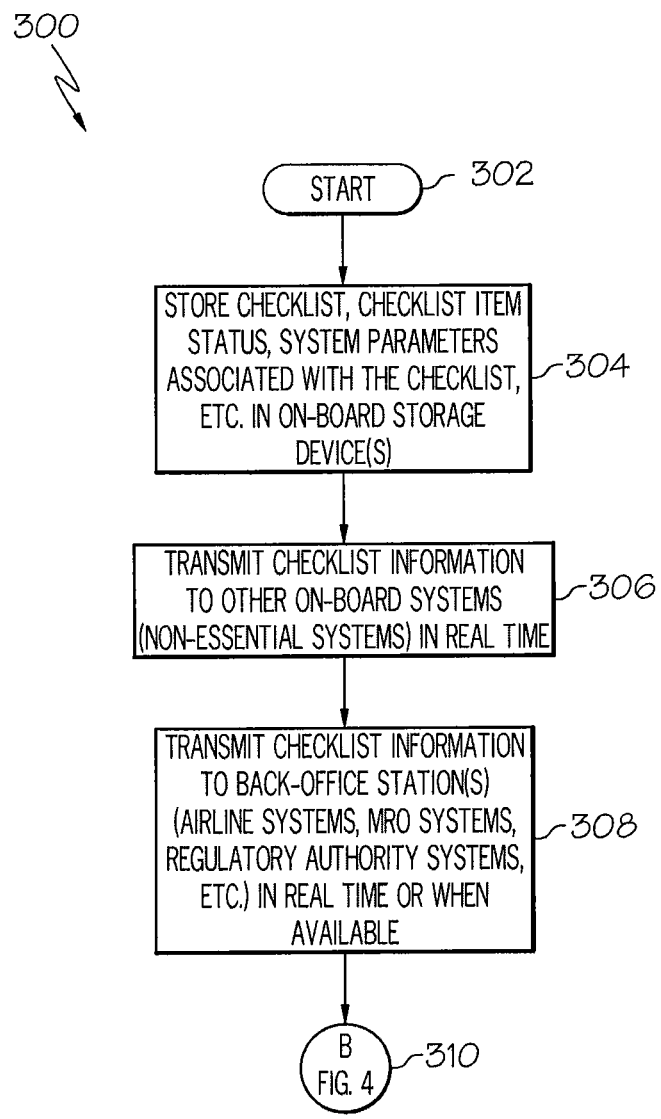
FIG. 3 is a flow chart of an example of a method for storing and communicating customized, automated checklist information in accordance with an embodiment of the present disclosure.

In block 218, each checklist item status update may result in performing storage and notification, as described in FIG. 3. After storage and notification 218, the method 200 may advance to block 220. In block 220, a determination may be made if a new checklist has been created, according to the method 100 previously described with reference FIG. 1. If no new checklist is available, in block 222, a determination may be made if the checklist is complete. If the checklist is not complete in block 222, the updated checklist may be displayed in block 210. If the checklist is complete in block 222, the method 200 may advance to block 224. In block 224, storage and notification may be performed, as described with reference to FIG. 3. In block 230, the checklist display may be closed.

If the user is currently executing a checklist when a new checklist becomes available at any time in blocks 202 and 220, the method 200 may determine in block 226 if the user has chosen to execute the new checklist. If the user chooses to execute the existing checklist in block 226, the existing checklist is displayed in block 210. If the user chooses to execute the new checklist in block 226, the new checklist replaces the old checklist in block 228. The method 200 polls parameters from on-board systems to complete any applicable checklist items in block 206. The checklist information is stored and notification is performed in block 208, as described with reference to FIG. 3. The customized checklist is displayed in block 210. If parameters from on-board systems change that result in the completion of one or more checklist items in block 212, then the checklist item status is updated in block 216. If manual interaction with the checklist system results in the completion of one or more checklist items in block 214, then the checklist item status is updated in block 216. If no new checklist items have been manually completed then the checklist is displayed in block 210. Each checklist item status update results in performing storage and notification in block 218, as described with reference to FIG. 3. After storage and notification in block 218, the method 200 determines if a new checklist has been created, according to the method 100 previously described above with reference to FIG. 1. If no new checklist is available a determination is made if the checklist is complete in block 222. If the checklist is not complete in block 222 the updated checklist is displayed in block 210. If the checklist is complete in block 222, the method 200 results in performing storage and notification in block 224, as described with reference to FIG. 3, and then closes the checklist display in block 230.

The method 200 is multi-threaded, allowing multiple concurrent checklist executions for each of pilots, and crewmembers.

FIG. 3 is a flow chart of an example of a method 300 for storing and communicating checklist information in accordance with an embodiment of the present disclosure. The method 300 may be performed as part of block 114 in FIG. 1, and blocks, 208, 218 and 224 in FIG. 2. The method 300 may start at block 302. In block 304, the checklist, checklist item status, vehicle parameters or conditions associated with the checklist and any other information related to the checklist may be stored in an onboard storage device of the checklist system. In block 306, the checklist information stored in block 304 may be transmitted to other onboard systems, such as on-board nonessential systems. Examples of on-board nonessential systems may include but is not necessarily limited to an electronic logbook, a health management system or similar electronic record keeping or maintenance system. Systems may include systems that are not necessary for the normal operation of the vehicle or system. These other nonessential systems may supplement existing information with the received checklist information. The checklist information combined with other system information may aid in maintenance of the vehicle or system, health management systems associated with the vehicle and improve aircraft analytics, such as fault and pilot response information. In block 308, the checklist information may also be transmitted to back-office systems in real-time or delayed. As previously discussed, examples of off-board systems may include but is not limited to airline systems, MRO systems, regulatory authority systems or other similar systems. The checklist information may be provided for each aircraft at a gate of an airport, while on the taxiway and runway, or during all phases of flight. The checklist information may be combined with other data to create business information that may be monitored and analyzed to improve airline operations, MRO operations and ATC operations.

Figure 4:
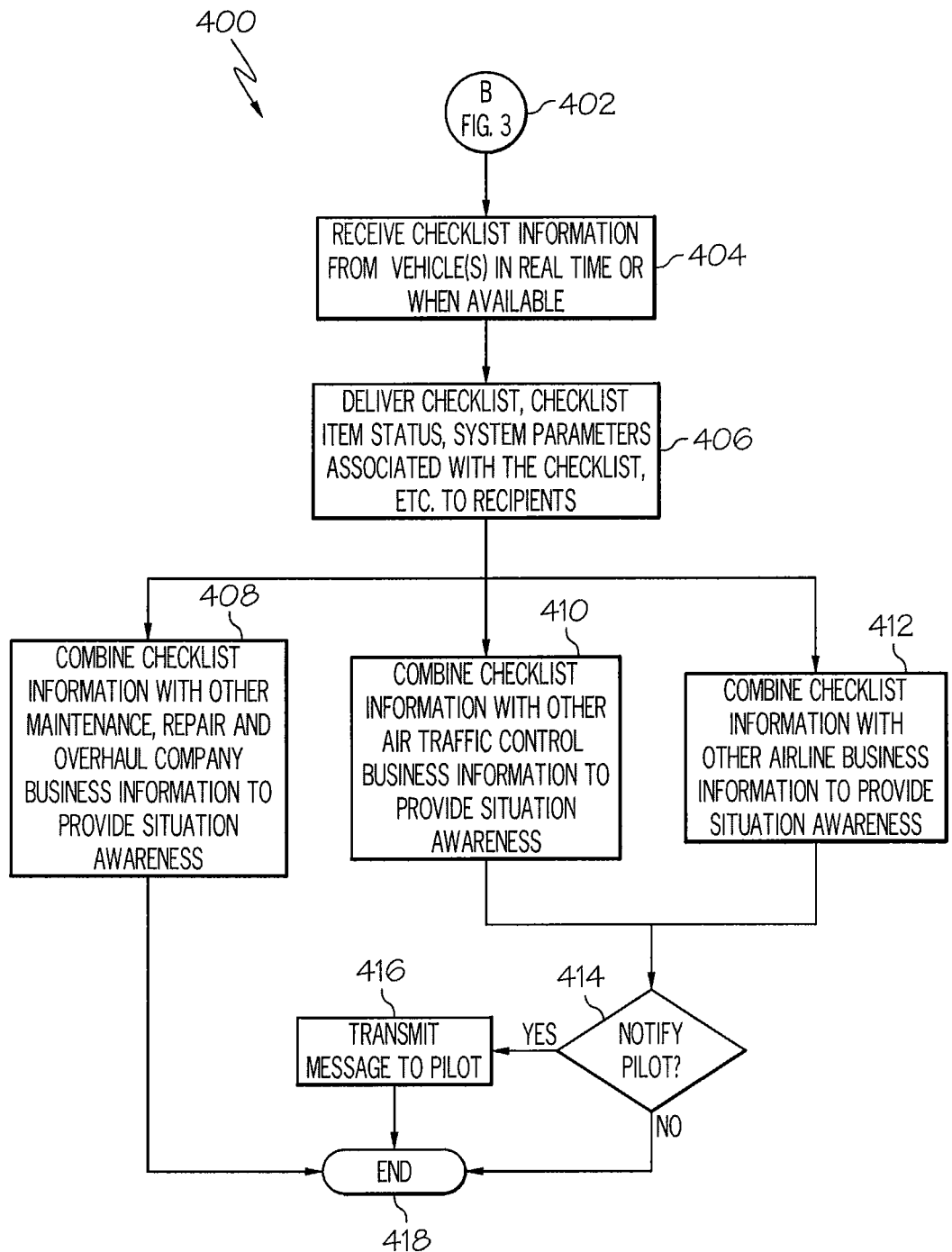
FIG. 4 is a flow chart of an example of a method for using checklist information by back-office systems in accordance with an embodiment of the present disclosure.

FIG. 4 is a flow chart of an example of a method 400 for using checklist information in accordance with an embodiment of the present disclosure. In block 404, checklist information may be received for the vehicle. The checklist information may include but is not necessarily limited to the checklist items, checklist item status, supplemental vehicle or system information associated with the checklist or similar information or data.

In block 406, the received checklist information may be delivered to all authorized recipients. In block 408, the received checklist information may be used to provide maintenance, repair and overhaul situational awareness, when combined with other maintenance, repair and overhaul business information. For example, the checklist information may be combined with maintenance history for that airframe which may indicate specific maintenance action and availability of spare parts prior to aircraft arrival. Once MRO information is combined with checklist information to create situation awareness is complete in block 408, the method 400 may end at termination 418.

In block 410, the received checklist information may be used to provide air traffic control situational awareness, when combined with other air traffic control information. For example, the checklist information may be combined with final approach runway assignment which may indicate specific air traffic control landing instructions.

In block 412, the checklist information may be used to provide airline situational awareness, when combined with other airline information. For example, the checklist information may be combined with flight plan and customer connections information which may indicate specific airline operations control corrective actions.

In block 414, a determination may be made whether to notify the pilot from a regulatory authority 410 or the airline 412. If so, the method 400 may advance to block 416 and a message may be transmitted to the vehicle or the vehicle may be contacted by a live person. If a determination is made in block 414 that the pilot does not need to be notified, the method 400 may end at termination 418.

Figure 5:
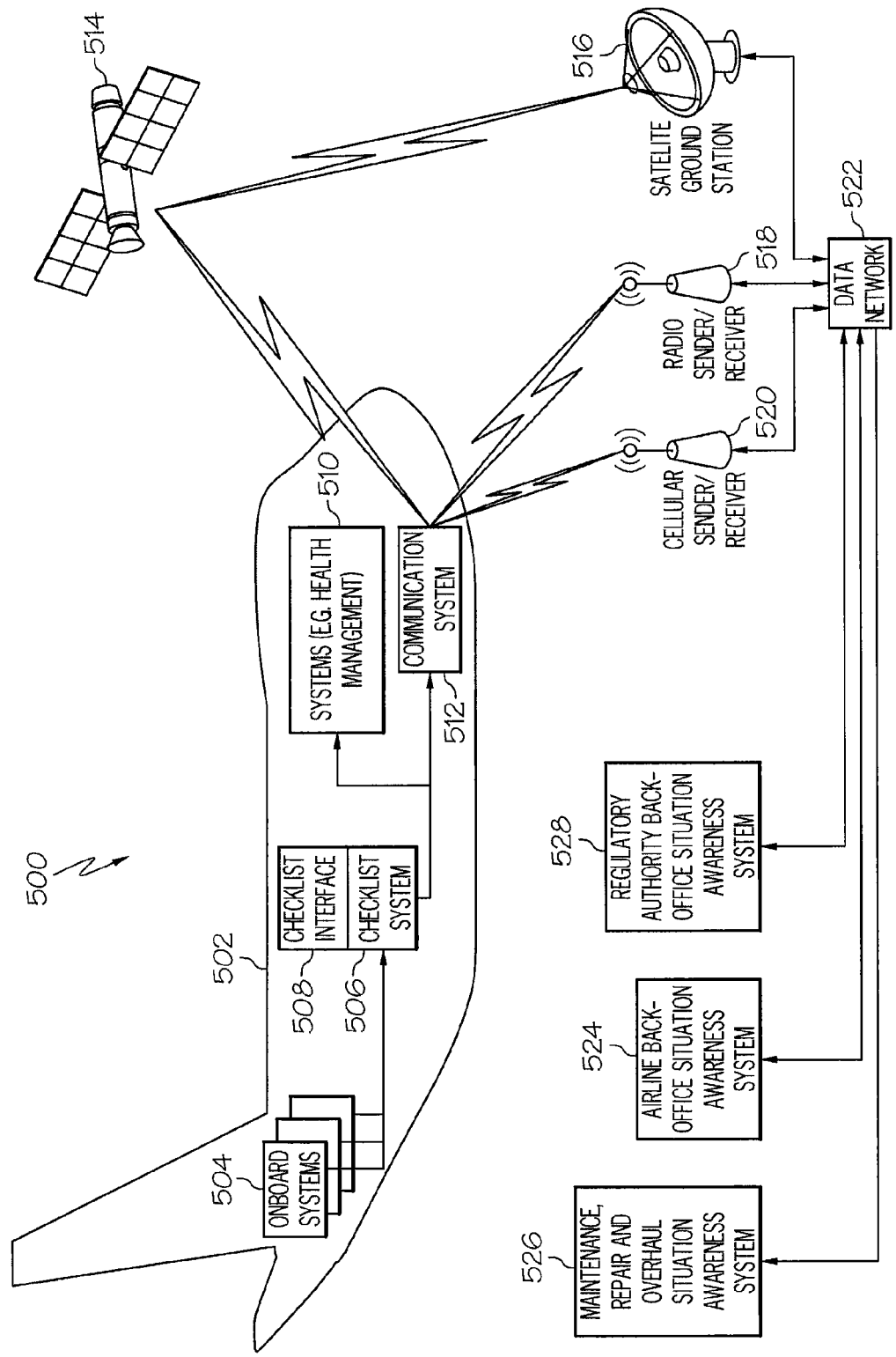
FIG. 5 is a block schematic diagram of an example of a system for creating, executing and communicating customized, automated checklists in accordance with an embodiment of the present disclosure.

FIG. 5 is a diagram illustrating of an example of a system 500 for creating, communicating, using, and receiving feedback on checklists in accordance with an embodiment of the present disclosure. The methods 100, 200, 300 and 400 may be embodied in the system 500 or certain components of the system 500. In the embodiment illustrated in FIG. 5, a portion of the system 500 is disposed on a vehicle (e.g. airplane) 502. The system 500 may include a set of on-board systems 504, a checklist system 506, a checklist interface 508, one or more other systems 510 including nonessential systems (e.g. health management system), a communication system 512, a satellite 514, and a satellite ground station 516, a radio sender/receiver 518, a cellular sender/receiver 520, a data network 522, an airline back-office situation awareness system 524, a maintenance, repair and overhaul back-office situation awareness system 526, and a regulatory authority back-office situation awareness system 528.

On-board systems 504 are individual systems that monitor and communicate, for example, aircraft altitude, flap angle, engine condition, cabin pressure, or other aspects of the airplane condition. The exemplary system 500 illustrated in FIG. 5 shows only three on-board systems 504. For purposes of this example, the first of on-board systems 504 is engine condition, the second of on-board systems 504 is flap angle, and the third of on-board systems 504 is cabin pressure. While FIG. 5 shows only three on-board systems 504, it is to be understood that an embodiment illustrated in FIG. 5 may be configured to include fewer than and more than three on-board systems 504, each of which communicating with the checklist system 506 and associated with checklist creation and checklist item completion as described above. Each on-board system 504 may contain a processor, business logic, and data storage. In an alternative embodiment, processor, business logic, and data storage for all on-board systems 504 may be centrally located.

In operation, the checklist system 506 may retrieve information related to the need for a checklist. In addition, the checklist system 506 may retrieve information related to completion of checklist items from onboard systems 504 and from the checklist interface 508. In addition, the checklist system 506 may receive a manual request for a specific checklist through the checklist interface 508. Specifically, the checklist system 506 includes a set of data parameters that define checklist items and sequencing, which checklist users need and are authorized to receive the custom checklist, and data is continuously pulled from respective onboard systems 504. The data, which has been retrieved, is correlated in terms of business rules within the checklist system 506. The business rules are associated with data received from onboard systems 504 and based on rules defined by an entity controlling how data is interpreted within the checklist system 506. For example, a different sequence of checklist items may be required depending on other on-board data, such as altitude from onboard systems 504. Additionally, different airlines may have a different set of tasks or different preferred sequence of task execution within the checklist system 506.

The checklist system 506 transmits checklist data as it changes to nonessential systems 510 which further process the checklist data in view of their respective functions. The checklist system 506 transmits checklist data as it changes to the communication system 512 which transmits checklist data off-board. The satellite 514 receives checklist data from the communication system 512 and retransmits it to a satellite ground station 516. The radio sender/receiver station 518 receives checklist data from the communication system 512. The cellular sender/receiver station 520 receives checklist data from the communication system 512. A satellite ground station 516, a radio sender/receiver station 518 and a cellular sender/receiver station 520 deliver checklist data to the data network 522. The airline back-office situation awareness system 524, the maintenance, repair and overhaul back-office situation awareness system 526, and the regulatory authority back-office situation awareness system 528 each receive checklist data from the data network 522. The airline back-office situation awareness system 524 and the regulatory authority back-office situation awareness system 528 may communicate with the airplane through the data network 522, the satellite ground station 516, a satellite 514, a radio sender/receiver 518, the cellular sender/receiver 520, and the communication system 512.

The system 500 or components of the system 500 may be included in a vehicle or other system. The system 500 will be described with the system being part of an aircraft 502, although those skilled in the art will recognize that the system 500 may also be used with other types of vehicles or systems, such as complex mechanical or electrical systems or machinery.

The system 500 may include an automated checklist system 506. The method 100 in FIG. 1 and method 200 in FIG. 2 may be embodied in or performed by the automated checklist system 506. The methods 300 of FIG. 3 may also be embodied in or performed by components of the checklist system 506 and the communication system 512. The automated checklist system 506 may receive parameters or other information from other onboard systems 504 during normal and abnormal conditions, for example, emergency conditions, to determine if a checklist is required, any customization is required to accommodate current aircraft system states or conditions, and to determine completion of checklist items. The automated checklist system 506 may also receive manual requests for a checklist and checklist action item completion from a checklist interface 508 to create customized checklists similar to that previously described. The automated checklist system 506 may create customized checklists for normal conditions, abnormal or emergency conditions, where a single fault or multiple faults occur. The automated checklist system 506 manages checklists through to completion. If a new checklist is created by the checklist system 506 while the recipient is already executing a checklist 506, the recipient is immediately given the choice to continue with the existing checklist or change to the new checklist on the checklist interface 508.

The automated checklist system 506 may provide results of checklist creation and checklist item completion to onboard systems 510 as supplemental information for analysis.

The system 500 may also include a communications system 512. The method 300 in FIG. 3 may be embodied in or performed by the communication system 512 for airplane/ground communications. The automated checklist system 506 may provide results of checklist creation and checklist item completion to back-office situation awareness systems 524, 526, and 528 via the communication system 512.

The system 500 may also include a communication receiver satellite 514 and satellite ground station 516, radio sender/receiver 518 and cellular sender/receiver 520. The method 400 in FIG. 4 may be embodied in or performed by the communication receiver satellite 514 and satellite ground station 516, radio sender/receiver 518 and cellular sender/receiver 520 for airplane/ground communications. The communication receiver satellite 514 and satellite ground station 516, radio sender/receiver 518 and cellular sender/receiver 520 may deliver the information to the data network 522 where it is delivered to a regulatory authority back-office situation awareness system 528, airline back-office situation awareness system 524, and maintenance, repair and overhaul back-office situation awareness system 526. The regulatory authority back-office situation awareness system 528 and airline back-office situation awareness system 524 may communicate back to the aircraft via the data network 522, satellite ground station 516 and satellite 514, radio sender/receiver 518 and cellular sender/receiver 520 and on-board communication system 512. The method 400 in FIG. 4 may be embodied in or performed by the regulatory authority back-office situation awareness system 528, the airline back-office situation awareness system 524, and the maintenance, repair and overhaul back-office situation awareness system 526.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. For example, the present disclosure is not limited aircraft use, but could be used in any environment where checklists are used. Piloted vehicles include not only aircraft, but ships, drones, helicopters, and rockets, for example. Other checklist environments include utilities, industrial operations, the hospitality industry, and medical, for example. This application is intended to cover any adaptations or variations of the present disclosure. The following claims are in no way intended to limit the scope of embodiments of the disclosure to the specific embodiments described herein.

What is claimed is:

1. A method for creating, executing and communicating customized, automated checklists, comprising:
dynamically creating, by a computer processor, a customized checklist including a plurality of checklist items, wherein dynamically creating the customized checklist comprises automatically polling, by an automated checklist system on-onboard a vehicle or other system, a plurality of onboard systems or subsystems for parameter values;
transmitting, by the computer processor, a notification to a predetermined recipient that the customized checklist is available;
displaying, by the computer processor, the customized checklist on an interface device in response to the customized checklist being selected by the recipient;
updating, by the computer processor, a status of each checklist item in response to each checklist item being completed;
determining, by the computer processor if a new checklist is available during execution of an existing checklist;
notifying the recipient, by the computer processor, that the new checklist is available during the execution of the existing checklist; and
presenting, by the computer processor, an option for the recipient to select one of continuing execution of the existing checklist or switching to execute the new checklist.

2. The method of claim 1, further comprising transmitting checklist information by the automated checklist system on-board the vehicle or other system to at least one system other than a system to which the checklist information is related in response to at least a parameter change on-board the vehicle or other system to complete a checklist item.

3. The method of claim 1, wherein dynamically creating the customized checklist comprises dynamically creating the customized checklist while another checklist is being executed.

4. The method of claim 3, wherein dynamically creating the customized checklist while another checklist is being executed comprises creating the customized checklist during normal operational conditions.

5. The method of claim 3, wherein dynamically creating the customized checklist while another checklist is being executed comprises creating the customized checklist in response to at least one fault condition.

6. The method of claim 1, wherein dynamically creating the customized checklist comprises dynamically creating the customized checklist in response to a change in a condition of the vehicle or other system.

7. The method of claim 1, wherein dynamically creating the customized checklist comprises dynamically creating the customized checklist from one or more standard checklists for the vehicle or other system.

8. The method of claim 1, wherein dynamically creating the customized checklist comprises optimizing the customized checklist in response to the current condition of the vehicle or other system.

9. The method of claim 1, wherein transmitting a notification to the predetermined recipient that the customized checklist is available comprises determining an authorized user to execute the checklist.

10. The method of claim 1, wherein transmitting a notification to the predetermined recipient that the customized checklist is available comprises determining an authorized interface device where the customized checklist may be displayed.

11. The method of claim 1, wherein updating the status of each checklist item in response to each checklist item being completed comprises receiving a notification from a user of the checklist on the interface device.

12. The method of claim 1, wherein updating the status of each checklist item in response to each checklist item being completed comprises receiving checklist item completion information from at least one of the plurality of onboard systems.

13. The method of claim 1, further comprising:
storing the status of each checklist item; and
storing parameters associated with the vehicle or other system that are relevant to the customized checklist.

14. The method of claim 2, wherein transmitting the checklist information to the at least one system comprises transmitting the checklist information to at least one other system onboard the vehicle.

15. The method of claim 2, wherein the vehicle or other system is an aircraft and transmitting the checklist information to the at least one system comprises transmitting the checklist information and parameters associated with the aircraft condition to back-office business systems for further processing.

16. The method of claim 15, wherein transmitting checklist information to back-office business systems for further processing comprises transmitting the checklist information in real-time.

17. The method of claim 1, further comprising providing information of checklist completion activity for an aircraft while the aircraft is at a gate at an airport, in a hanger, or during all phases of flight.

18. The method of claim 17, further comprising providing the information of checklist completion activity and the set of parameters associated with the aircraft to a back-office airline business system.

19. A system for creating, executing and communicating customized, automated checklists, comprising:

a computer processor;

an automated checklist system, embodied on the computer processor, communicatively coupled to at least one system on a vehicle or other system, the automated checklist system being adapted to dynamically create a customized checklist including a plurality of checklist items, transmit a notification to a predetermined recipient that the customized checklist is available, and indicate checklist items as completed based on changes to parameters including manual input, and the automated checklist system being configured to perform a set of functions comprising automatically polling a plurality of onboard systems or subsystems for parameter values to dynamically create the customized checklist; and an interface device for displaying the customized checklist in response to the customized checklist being selected by the recipient, wherein a status of each checklist item is updated by the automated checklist system or by any manual input and is displayed on the interface device in response to each checklist item being completed, and wherein the recipient is notified during execution of an existing checklist when a new checklist is available for use, an option being presentable to the recipient to continue with the existing checklist or to switch to the new checklist.

20. The system of claim 19, wherein the automated checklist system comprises:

a module to dynamically create a new customized checklist in response to a change in a condition of the vehicle or other system while a previous checklist is being completed by the recipient; and a module to notify the recipient that the new customized checklist is available and to present the option for the recipient to select one of: to continue completion of the previous checklist or to switch to the new customized checklist.

21. The system of claim 19, wherein the customized checklist is optimized by removing any checklist items that cannot be performed to reduce a workload of the recipient.

22. The system of claim 19, wherein the vehicle or other system is an aircraft, the system further comprising a communications device to transmit information of checklist item completion activity for the aircraft while the aircraft is at a gate at an airport, at a hanger, or during each phase of flight and to transmit a set of parameters associated with the aircraft.

23. The system of claim 19, further comprising at least one storage device to store a status of each checklist item and parameters associated with the vehicle or other system that are relevant to the customized checklist.

24. A computer program product for creating, executing and communicating customized, automated checklists, the computer program product comprising:

a non-transitory computer readable storage medium having computer readable program code embodied therewith, the computer readable program code comprising:

computer readable program code configured to dynamically create a customized checklist including a plurality of checklist items, wherein the computer readable program code configured to dynamically create the customized checklist comprises computer readable program code configured to automatically poll, by an automated checklist system on-onboard a vehicle or other system, a plurality of onboard systems or subsystems for parameter values;

computer readable program code configured to transmit a notification to a predetermined recipient that the customized checklist is available;

computer readable program code configured to display the customized checklist on an interface device in response to the customized checklist being selected by the recipient;

computer readable program code configured to update a status of each checklist item in response to each checklist item being completed;

computer readable program code configured to determine if a new checklist is available during execution of an existing checklist; and computer readable program code configured to allow a user to switch to the new checklist during the execution of the existing checklist;

computer readable program code configured to notify the recipient that a new customized checklist is available; and computer readable program code configured to present an option for the recipient to select one of continuing executing the existing checklist and switching to execute the new customized checklist.

25. The method of claim 1, wherein dynamically creating the customized checklist comprises:

removing checklist items from the customized checklist for systems of a vehicle that are non-operational; and re-sequencing checklist items remaining on the customized checklist based a priority of the remaining checklist items and information from systems of the vehicle that are operational.

26. The method of claim 1, further comprising re-sequencing checklist items based on information from vehicle systems.

* * * * *